United States Patent

Dickopp

[15] 3,696,220

[45] Oct. 3, 1972

[54] RECORD DISC HAVING ELASTIC DEFORMATION BY THE PICKUP

[72] Inventor: Gerhard Dickopp, Berlin, Germany

[73] Assignee: Licentia Patent-Verwaltungs-G.m.b.H., Frankfurt am Main, Germany

[22] Filed: Nov. 5, 1970

[21] Appl. No.: 87,064

[52] U.S. Cl............179/100.4 R, 106/37, 178/6.6 A, 179/100.11 P, 274/41 A, 274/42 R

[51] Int. Cl.............................G11b 3/10, G11b 3/70

[58] Field of Search........274/41 A, 42; 179/100.4 R, 179/100.4 C, 100.41 P; 178/6.6 A; 106/37

[56] References Cited

OTHER PUBLICATIONS

World Premiere Video Disc Berlin 1970, Page 41 and the Illustration Preceding page 21, 6/24/70

*Primary Examiner*—Bernard Konick
*Assistant Examiner*—Raymond F. Cardillo, Jr.
*Attorney*—Spencer & Kaye

[57] ABSTRACT

A record disc containing grooves whose walls undulate to constitute a spatial representation of the time variation of a signal to be reproduced by means of a pressure responsive playback head carrying a stylus which engages in the groove and elastically deforms the groove walls to a substantial degree, the resulting elastic restoring force being sensed by the head, the disc having a modulus of elasticity of no more than 10,000 Kgf/cm$^2$.

8 Claims, 4 Drawing Figures

PRIOR ART Fig. 1
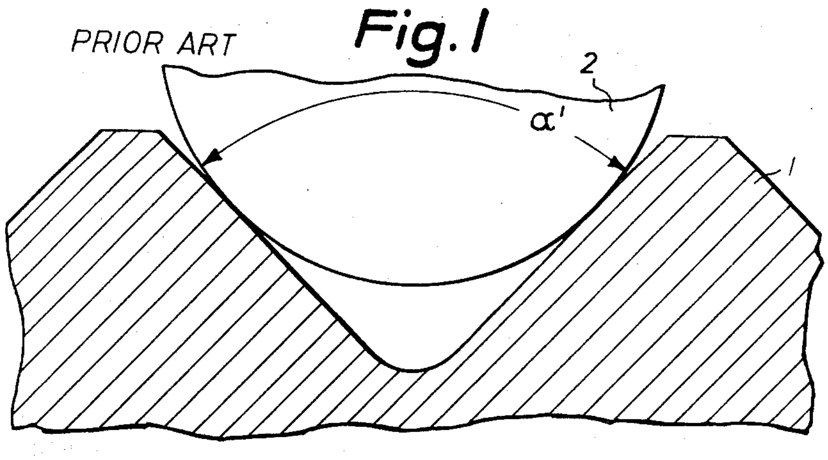
Fig. 2
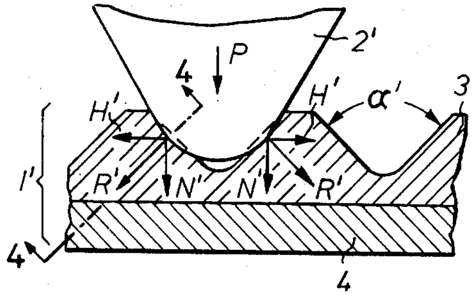
Fig. 3
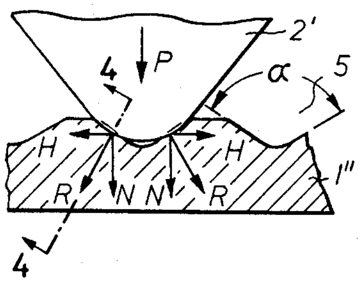
Fig. 4
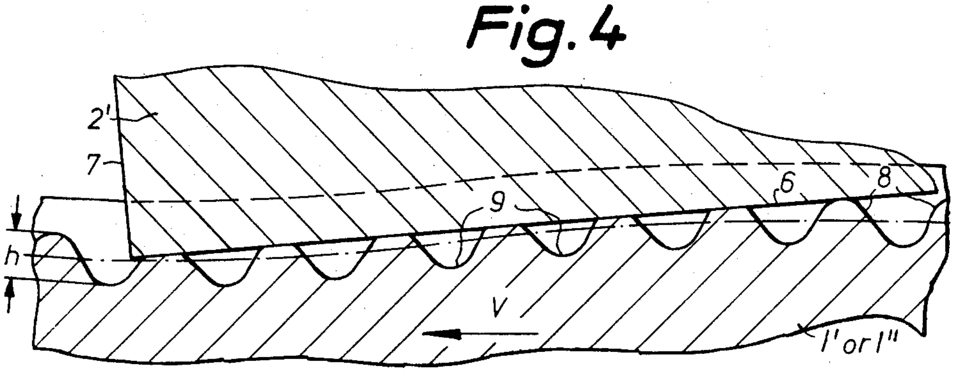
Inventor:
Gerhard Dickopp
BY Spencer & Kaye
ATTORNEYS.

RECORD DISC HAVING ELASTIC DEFORMATION BY THE PICKUP

BACKGROUND OF THE INVENTION

The present invention relates to record discs and particularly to discs for recording high frequency signals. In U.S. Pat. application Ser. No. 798,709, now U.S. Pat. No. 3,652,809, filed by Gerhard Dickopp, Hans-Joachim Klemp, Horst Redlich and Eduard Schüller on February 12th, 1969, there is disclosed a system for reproducing signals recorded on a record carrier whose surface is provided with deformations corresponding to the variation of the signals with respect to time, and which is provided with a playback head having a contact element exerting a contact force upon the surface of the support moving by. This system is characterized by the fact that the playback head serves as a pressure sensing pickup excited by the time variation of the contact force corresponding to the deformations, the playback head having the shape of a transducer body mechanically biased in the direction of the contact force. The contact takes place either directly or via an essentially inherently rigid coupling piece. Preferably, the elastic deformation of the surface of the carrier due to the contact force is considerably greater than the opposed lateral deflection of the contact element of the playback head due to the compression.

In connection with scanning methods known before the invention disclosed in the above-identified application for disc-like carriers care has always been taken that, for given groove dimensions and radii of curvature of the pickup stylus, the reduction of the contact element deflection amplitude resulting from both elastic and permanent deformations of the material of the carrier remain small, as compared with the amplitude variations of the record deformations. Otherwise an undersired reduction of the signal level and playback distortions would have occurred.

In the system disclosed in the above-identified application, however, the deformations of the surface of the carrier forming the signal recording are strained within the elastic limit of the carrier material in such a way that the amount by which they are compressed by the contact force of the surface of the playback head contact element is essentially greater than the comparatively small amplitude of the opposed deflection of the contact element. The carrier deformations may be compressed to such an extent that the surface of the support bearing the deformations will be practically levelled under the sliding contact of the contact element. It has been found that the system according to the above-identified application practically removes the upper frequency limit normally existing for the scanning of disc-like carriers so that the recording and reproduction of signal frequencies in the MHz range is rendered possible.

In the course of reducing the system of the above-identified application to practice it has been found that good performance depends essentially on the qualities and the design of the disc-type carrier used for the recording.

SUMMARY OF THE INVENTION

A primary object of the present invention is to provide a good carrier for such system, in particular one which meets the requirements of the direct pressure playback in the case of an essentially elastic change of shape of the deformations constituting the signal recording.

These objects are achieved by a signal carrier whose surface possesses deformations which correspond with the time variation of the recorded signal and which can sustain essentially elastic deformations during reproduction by a pressure playback head, the carrier being composed of, in at least the layer containing the deformations, a material whose modulus of elasticity in compression is no greater than 10,000 $kgf/cm^2$ (kilograms force per square centimeter).

The use of such a material for a signal carrier whose spatial deformations are to be sensed mechanically is quite unusual and novel. Disc-type carriers for mechanical sensing such as are known to date are always made of a material whose modulus of elasticity is greater than 30,000 $kgf/cm^2$. This was essentially in order to assure that the deformations representing the signal would not be compressed to any considerable degree under the influence of the pickup pressure.

However, in case of the carrier according to the present invention, the range over which the shape of the deformations can be changed elastically is utilized to a considerable degree, and a pressure force corresponding to the elastic restoring force of the carrier material is exerted upon the playback head. This pressure changes whenever a deformation peak moves by under the generally sliding contact surface of the playback head contact element.

Practical testing has shown that a material whose modulus of elasticity is below the limit of 10,000 $kgf/cm^2$, but at the same time greater than 3,000 $kgf/cm^2$, is well suitable for the surface layer of the carrier containing the deformations. It is advantageous to use a material for which the relation of the permissible compressive stress to the modulus of elasticity is high. This means that the material, while being soft, is at the same time also relatively solid, i.e., suitable for the absorption of high compressive loads, so that large deformation amplitudes can be achieved.

The permissible compressive stress may be presumed to be equal to the compressive stress at the elastic limit.

Though plastic materials as a practical matter have essentially a zero elastic limit, this limit may be defined as the limit where the upsetting factor, or permanent set, is small, for example one percent. In some data sheets for plastic materials there are specified only values of the ball pressure hardness. These values are approximately proportional to those of the compressive stress at the "elastic limit". Thus it is in the same manner advantageous to use a material for which the relation of the ball pressure hardness to the modulus of elasticity is a relative great one.

According to experiments carried out to date, polyurethanes and polyesters as well as modified polyester resins may be cited as examples of materials meeting the requirements indicated. Among the immense variety of plastics further suitable materials will certainly be found.

The mentioned material constants — modulus of elasticity and permissible compressive stress — are not the only decisive factors relating to the ability of the deformations representing the signal to sustain considerable changes of shape, in the extreme case this involving the complete levelling of the peaks and valleys of these deformations. The absolute size of the deformations, particularly their peak-to-valley height $h$, also plays an important role.

It has been found through experiment that for the mentioned constant values of the material, it may be compressed within its elastic deformation range, if the height $h$ of the deformations representing the signal is smaller than $2\mu$ (microns). Because in this case, in general, playback elements, or styli, are used whose surface in contact with the deformations is shaped like an elongated skid sliding in a groove containing the deformations, several peaks and valleys of these deformations will be under the skid-like pickup element surface at any given time. Therefore, it is expedient to shape the deformations in such a way that the height h is substantially constant in the main, so that all of the peaks will be situated on the same height, this in particular being independent of the wavelength of the deformations. A change in the pressure exerted upon the pickup will take place whenever such a deformation peak leaves the contact range of the skid-like pickup at the preferably sharp trailing edge of the pickup. The equality of the heights of the deformation peaks can be obtained by known types of modulation, e.g. frequency modulation.

Carriers according to the invention are in general played back, in accordance with their function to render possible the reproduction of very high recorded signal frequencies, at high relative speeds between the carrier surface and the pick-up. While in case of known long-playing sound records this relative speed is 0.5 m/s at the most, a carrier according to the invention using a pressure pickup system can run with relative speeds of up to 10 m/s and more, depending on the frequency band to be transmitted. The small height of the modulation deformations from peak to valley of 1 to 2 $\mu$ permit the use of considerably narrower groove widths, so that even with high relative speeds a sufficient recording time will be obtained.

In order to reduce the frictional forces between the surface of the pickup and the deformations contained in a groove, as well as the pinch effect, as far as possible, a preferred embodiment of a carrier according to the invention has groove sides which form an obtuse angle. This angle, according to results of experiments, may advantageously be between 120° and 160°.

BRIEF DESCRIPTION OF THE DRAWINGS

FIG. 1 is a cross section through a portion of a standard sound recording disc containing the grooves, with the lower part of the pickup running in the groove.

FIG. 2 is a cross-sectional view of several grooves of a record carrier according to the invention and shown to the same scale as FIG. 1.

FIG. 3 is a view similar to, and to the same scale as, that of FIG. 2 of another embodiment of the invention.

FIG. 4 is a cross-sectional view of the invention taken along the planes 4—4 of FIGS. 2 and 3.

DESCRIPTION OF THE PREFERRED EMBODIMENTS

FIG. 1 shows a view through the record carrier at right angles to the longitudinal axis of the groove. The carrier is one normally used for sound recording and its groove walls form an angle $\alpha'$ equal to 90°. In the groove, the spherical end of a pickup 2 is guided and is deflected in a lateral direction with horizontal and vertical components corresponding to the deformations of the groove, the pickup body transforming such deflection movements into corresponding movements of an electromechanical transducer which, for instance in the case of a stereo recording, transforms the horizontal and vertical components of motion into corresponding electrical signals for two sound channels connected with one another stereophonically.

FIG. 2 is a view in the same direction, and to the same scale, as the view of FIG. 1, showing a record carrier according to the invention. This carrier as a whole has been denoted by 1', but it consists of the layer 3 containing the grooves and the deformations and a part 4 consisting, in case of necessity, of a material with different physical properties, the part 4 supporting the layer 3. As in the embodiment of FIG. 1, the walls of the groove form an angle $\alpha'$ of 90°.

The playback stylus 2' exerts a pressure P on the carrier 1' and this produces resultant forces R' at the walls of the groove. These resultants may be considered to be constituted by horizontal components H' running parallel to the surface of the carrier when it is unmodulated, i.e. ungrooved, and normal components N' perpendicular to the unmodulated surface of the carrier. Only the latter components produce a useful reaction on the pickup 2' upon the compression of the deformations existing in the grooves, while the opposing horizontal components H' cancel each other and, consequently, remain useless. These useless horizontal components increase the friction between the pickup and the carrier, thus causing useless wear of the disc and of the pickup.

Moreover, with the pressure reproduction to which the invention is directed, the part of the pickup stylus engaged in the groove possesses a relatively great length in the direction of the groove axis. Due to a radial wobble of the disc, or more precisely the groove, which always exists to a small extent, a slight inclined orientation of the skid-like or runner-like part of the pickup in the groove will occur. As a result, in the case of steep groove walls an undesired portion of the skid-like part bears against the groove wall so that the stylus part is no longer in good contact with the support.

Another disadvantage is that dust particles can easily jam in a groove having steep walls, so that they can no longer be removed by the pickup. This will lead to the lifting of the pickup from the surface of the groove and, consequently, to distortions. In order to reduce these difficulties still inherent in the pressure pickup, a further embodiment of the carrier or disc according to the invention utilizes a groove profile the walls of which form an obtuse angle, preferably between 120° and 160°.

FIG. 3 shows a cross section through a support where the angle between the walls of the groove has been so dimensioned. In this embodiment, especially the amplitude of the horizontal components H has been reduced as compared with the amplitude of the normal components N, while amplitudes of the resultants R might correspond to those of the embodiment of FIG. 2. With such a design for the included angle, it is possible to take greater advantage of the principle of the pressure pickup with a yieldable carrier having a low modulus of elasticity. To this the advantage is added, which is important also by itself, that adherent dust may more easily be cleaned from the carrier by wiping. This will reduce the noise level, which is, of course, especially critical with the small dimensions of the signal recording elements according to the invention. During playback according to the invention, the playback head need not, as in the case of known sound discs having considerable horizontal deformation components, follow any large lateral deformations in the groove. They must only yield to the essentially slower vertical and horizontal wobble present. Therefore, flat grooves are completely sufficient for guiding the pickup at least over a distance equal to the spacing between adjacent grooves.

Due to the interaction between the physical properties of the disc material, selected with regard to the desired elastic deformation and made of a suitable plastic, and the shaping of the groove to have walls which form an angle of more than 90°, preferably from 120° to 160°, a record disc of good resistance to wear and accordingly long durability will result.

If, for example, a carrier 1'' having the form shown in FIG. 3 is made of a polyvinylchloride, polyurethane or modified polyester resin with a modulus of elasticity below 10,000 kgf/cm² and if the angle formed by the walls of the groove 5 is 120°, the passage of the stylus will produce elastic changes in shape of the deformations representing the recorded signal and formed in the groove, which create normal reaction components N sufficient to satisfactorily modulate the biasing pressure force P with which the pickup stylus bears against the groove, which modulation is a reproduction of the recorded signal. The already mentioned lower limit of the modulus of elasticity of about 3,000 kgf/cm² establishes that very soft materials, like rubber, are excluded because they would permit only a relatively small intelligence signal, as represented by the level of the force which modulates the biasing pressure force P, to be obtained. The maximum pressure fluctuation at the pickup stylus is obtained if the deformations of the groove are completely levelled under the influence of the bearing load. The useful amplitude of the modulation is proportional to the difference in pressure between the point of a peak of deformation and the point of a depression or valley of deformation. But in the case of soft materials this difference is low, corresponding to their low modulus of elasticity.

On the other hand, the material should not be so hard that, with the bearing loads permissible for reasons of wear and stability for the pickup, the deformation peaks would be compressed by only a small amount. This would present various disadvantages. Firstly, the pickup operation would become very sensitive to height fluctuations of the playback head because a complete lifting from the surface of the groove would easily occur and would cause serious distortions. Secondly, small dust particles and dirt would lead to relatively high extraneous pulses, because they could not become pressed into the material.

A third disadvantage would be a reduction in band width of the signal that may be reproduced. If the signal is recorded as the modulation of a carrier wave and if the deformations can be compressed but relatively little, only a short impulse can be sensed during each carrier wave oscillation period. According to pickup theory, it will be possible to obtain a band width of the demodulated signal equal to half the carrier frequency. If softer material is used for the discs and the deformation peaks are compressed, for instance, to one-half their height, additional information within the carrier oscillation period will be obtained and with it an extension in the frequency range of the demodulated signal by a factor of 2, which, it is true, cannot be utilized completely due to the necessary suppression of the carrier oscillation.

Depending on the material used for the disc, a different value will result for the permissible size of the modulation deformations. It has proved to be expedient and sufficient if under the aforementioned conditions the double amplitude of the deformations, i.e. the distance from a peak to a depression, is smaller than $2\mu$. Suitably, the deformation amplitude is chosen to be constant for all recorded frequencies.

In case of such a dimensioning, the pickup relations will be so favorable that the width of the groove may be reduced quite considerably, as compared with the known sound disc groove. This leads to a corresponding increase in the playing duration or a reduction in the size of the disc. A groove width of 0.01 to 0.02 mm has proved to be particularly favorable.

In the longitudinal section through the groove of a carrier 1 as shown in FIG. 4, the skid- or runner-like configuration of the lower part of the pickup stylus 2' traveling in the groove is apparent. This lower part has a leading edge 6 descending to the surface of the groove in a gradual slope and a steep trailing edge 7. The direction of travel of the groove relative the pickup 2' is indicated by the arrow V. The peaks 8 of the deformations on the bottom of the groove, containing the signal are situated at a height h above the corresponding depressions 9, the said height thus representing the double amplitude of the deformation recording. It may be seen from the drawing that the skid-shaped bottom of the pickup 2' rests on several peaks at any given time.

In operation, the stylus 2' travels along the groove in the record disc and rests on several deformation peaks at the same time. The stylus compresses the disc surface under the influence of its bearing force and this in turn causes the "hill and dale" height variations at the base of the groove to be converted into corresponding pressure variations. The distribution of the pressure along the skid-shaped bottom, or tip, of the stylus corresponds more or less to the recorded information in the region of contact between the stylus and the groove.

The gradually sloping leading edge 6 of the stylus enables it to glide easily over the groove deformations in the manner of a sled runner, without damaging or destroying these deformations. During the playback operation, the stylus bearing force, or loading, which is substantially constant with respect to time, has an alternating component superimposed on it. This alternating component corresponds to the recorded signal and is produced by the interaction between the steep trailing edge 7 of the stylus and the deformation peaks. When each deformation peak passes beyond the trailing edge 7 of the stylus, the pressure previously exerted on that peak by the leading edge 6 of the stylus is abruptly relieved. This instantenous load relief is sensed by the pressure transducer since it results in an abrupt change in the reaction force being exerted on the stylus by the groove deformations. This permits not only the average value of the information represented by the portion of the groove under the leading edge 6, but also the information contained in the relatively short groove portion adjacent the trailing edge 7 to be sensed.

A record carrier according to the invention can suitably be played back by a system of the type disclosed in the copending application previously referred to herein. A practical embodiment of such system could employ a sapphire or diamond stylus 2′ rigidly connected to a piezoceramic element which functions as the actual pressure transducer. The force P with which the stylus bears against the record could suitably be of the order of 0.2 gf (grams force), which force is completely adequate for satisfactory tracking since the stylus is not required to undergo any lateral movements in the groove.

Suitable materials for record discs according to the invention are for example some polyurethanes. These materials are products of a chemical addition of hexamethylendiisocyanats and glycoles. The polyurethanes $U_0$, $U_{20}$ and $U_{50}$, sold under the commercial trade name"Durethan $U_0$", " — $U_{20}$" and " — $U_{50}$" respective by the"Bayer AG" — Corporation, W-Germany, Leverkusen, have values of the modulus of elasticity of about 8,500; 5,000; and 3,300 kgf/cm², respectively, and values of ball pressure hardness of about 850, 600 and 380 kgf/cm², respectively. The ratio between this hardness and the modulus of elasticity is about 0.1, 0.0915 and 0.115, respectively. Because these ratios are approximately proportional to the ratios of the permissible compressive stress at the elastic limit to the modulus of elasticity, and because this last mentioned ratio shall be a large one, "Durethan $U_{50}$" and "Durethan $U_0$" are preferred materials for a record according to the invention.

Other suitable materials are "Hostalit Z 720/70", " — 840/70" and " — 870/70" (Commercial trade mark of "Hoechst AG"-Corporation, W-Germany, Hoechst) with modulus of elasticity of about 10,000; 8,500 and 5,000 kgf/cm² and values of ball pressure hardness of about 900, 750 and 350 kgf/cm², respectively. The ratios of said values of hardness to modulus of elasticity are 0.09, 0.088 and 0.07, respectively.

Other suitable materials may easily be found. For example the "Kalle AG"-Corporation, W-Germany, Wiesbaden-Biebrich reports that it would be able to make a soft polyester having a modulus of elasticity smaller than 10,000 kgf/cm² and a relatively high ratio of permissible compressive stress to modulus of elasticity. The mentioned ball pressure hardness is measurable by pressing a ball having a diameter D of 0.5 cm with a force P of 50 W-Germany, on the surface of the test material and by measuring the depth $h$ of the indentation. The ball pressure hardness H may be calculated by the formula:

$$H = P/\pi \cdot h \cdot \mathrm{D}\ \mathbf{0.07},$$

The values of ball pressure hardness $H$ calculated in this manner are dependant on the time during which the force $P$ is acting on the surface of the test material. To date in normal data sheets of plastic materials there are only noted values of the ball pressure hardness measured after a relatively long time of for example 10 minutes, during which the force $P$ was acting on the surface of the test material. The values of the ball pressure hardness cited here before were measured after such a relative long time. In connection with the carrier according to the invention, values of the ball pressure hardness measured after a very short time during which the force $P$ was acting on the surface would be interesting but are not noted in data sheets to date. Thus the effective values of the ratio of ball pressure hardness to modulus of elasticity — as far as important in connection with the invention — will be much greater than the values of 0.07 to 0.115 cited here before. Nevertheless these cited values will give a measure which will allow to compare the values of said ratio of different plastic materials.

The layer 4 of FIG. 2 preferably has a higher modulus of elasticity than layer 3. A suitable material for layer 4 is polyester or for example "Genotherm-Folie, Typ UG" of the "Kalle AG"—Corporation, W-Germany, Wiesbaden-Biebrich.

It will be understood that the above description of the present invention is susceptible to various modifications, changes and adaptions, and the same are intended to be comprehended within the meaning and range of equivalents of the appended claims.

I claim:

1. A record disc having at least one surface provided with a groove whose walls have permanent deformations constituting a spatial representation of the time variation of a signal to be reproduced by the passage of a pressure responsive playback head along the groove, at least the groove walls of said disc consisting of a material whose modulus of elasticity is no greater than 10,000 kgf/cm² and which has a high permissible compressive stress/modulus of elasticity ratio, whereby the material can be elastically deformed by a substantial amount by the passage of the playback head.

2. An article as defined in claim 1 wherein the modulus of elasticity of said material is equal to or greater than 3,000 kgf/cm².

3. An article as defined in claim 1 wherein the maximum peak-to-valley height of the permanent deformations in the groove walls is no greater than 2$\mu$.

4. An article as defined in claim 1 wherein the peak-to-valley height of the deformations is substantially constant along the entire length of the groove and is independent of the wavelength between successive deformation peaks.

5. An article as defined in claim 1 wherein said material is a plastic.

6. An article as defined in claim 5 wherein said plastic is selected from the group consisting of polyvinyl chloride, polyurethane and polyester resin.

7. An article as defined in claim 1 wherein the walls of said groove form an obtuse angle.

8. An article as defined in claim 7 wherein said angle is between 120° and 160°.

* * * * *

UNITED STATES PATENT OFFICE
CERTIFICATE OF CORRECTION

Patent No. 3,696,220 Dated October 3rd, 1972

Inventor(s) Gerhard Dickopp

It is certified that error appears in the above-identified patent and that said Letters Patent are hereby corrected as shown below:

In the heading of the patent, after line 8, insert
-- [30] Foreign Application Priority Data
November 5, 1969 Germany..........P 19 56 504.9--.
Column 1, lines 37 and 38, change "undersired" to --undesired--. Column 7, line 30, change "5,000" to --5,500--; line 56, change "W-Germany," to --kg--; line 62, formula $H=P/\pi \cdot h \cdot D0.07$ should read $H=P/\pi \cdot h \cdot D$ Signed and sealed this 24th day of April 1973.

(SEAL)
Attest:

EDWARD M. FLETCHER, JR.
Attesting Officer

ROBERT GOTTSCHALK
Commissioner of Patents